Patented Nov. 22, 1927.

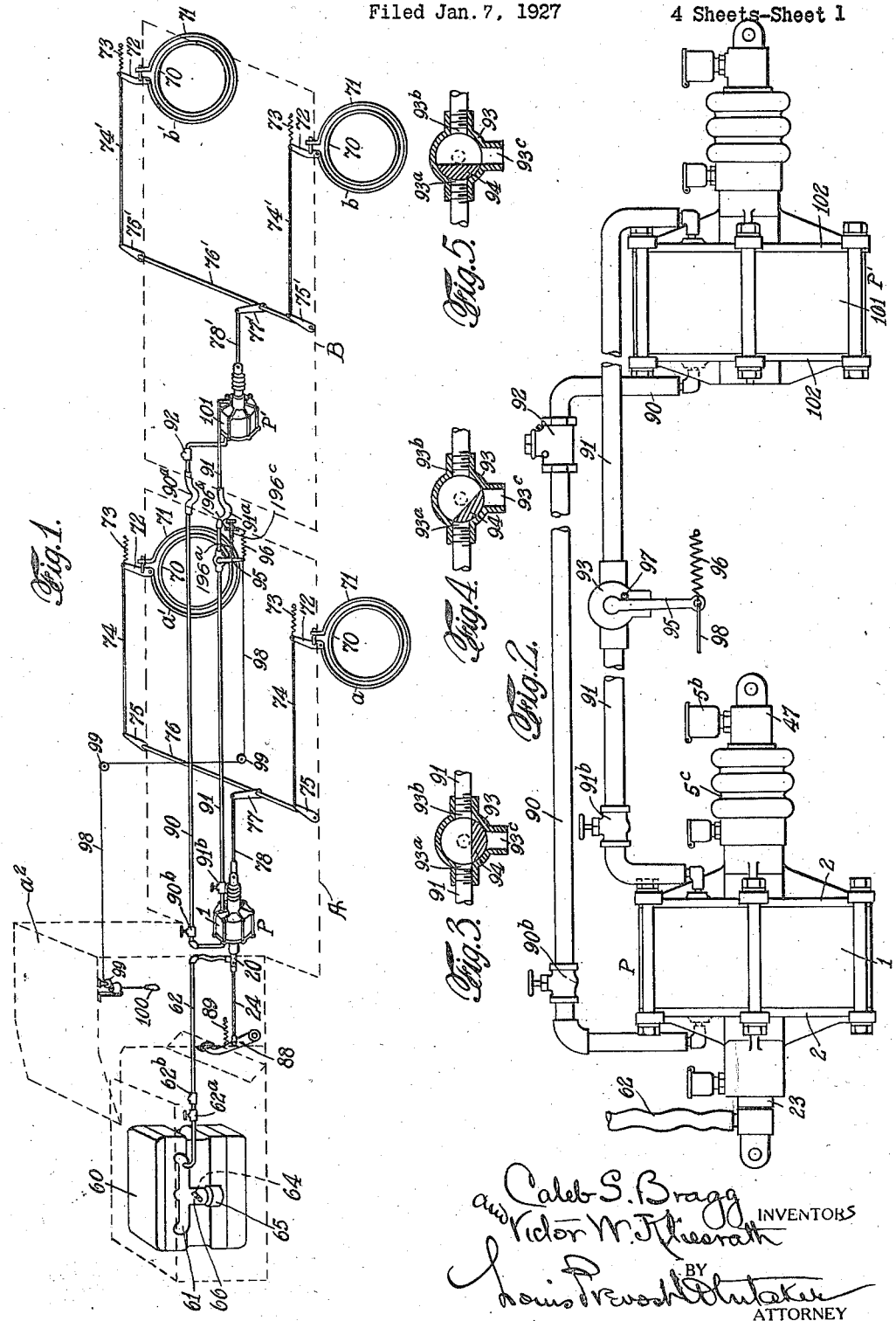

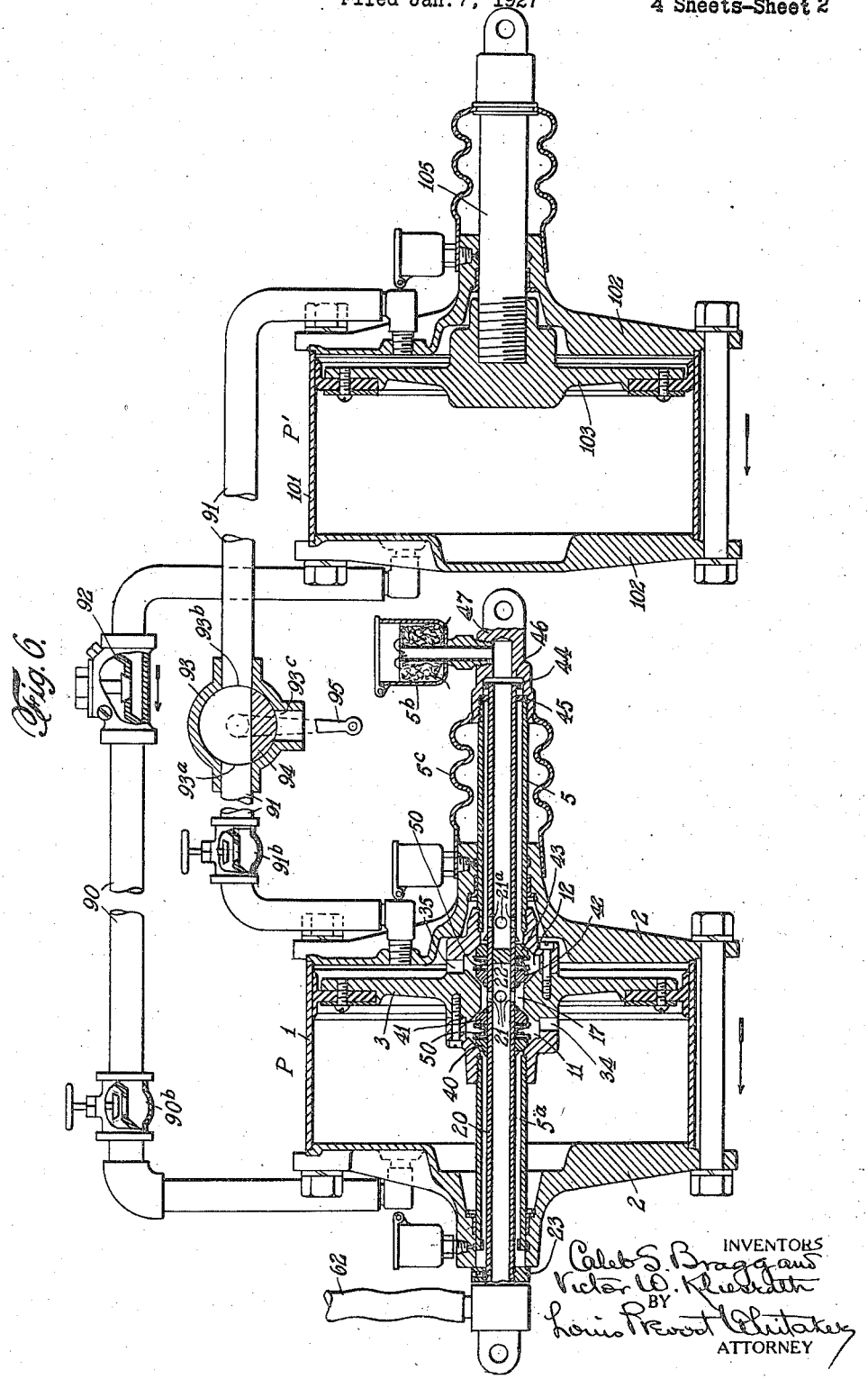

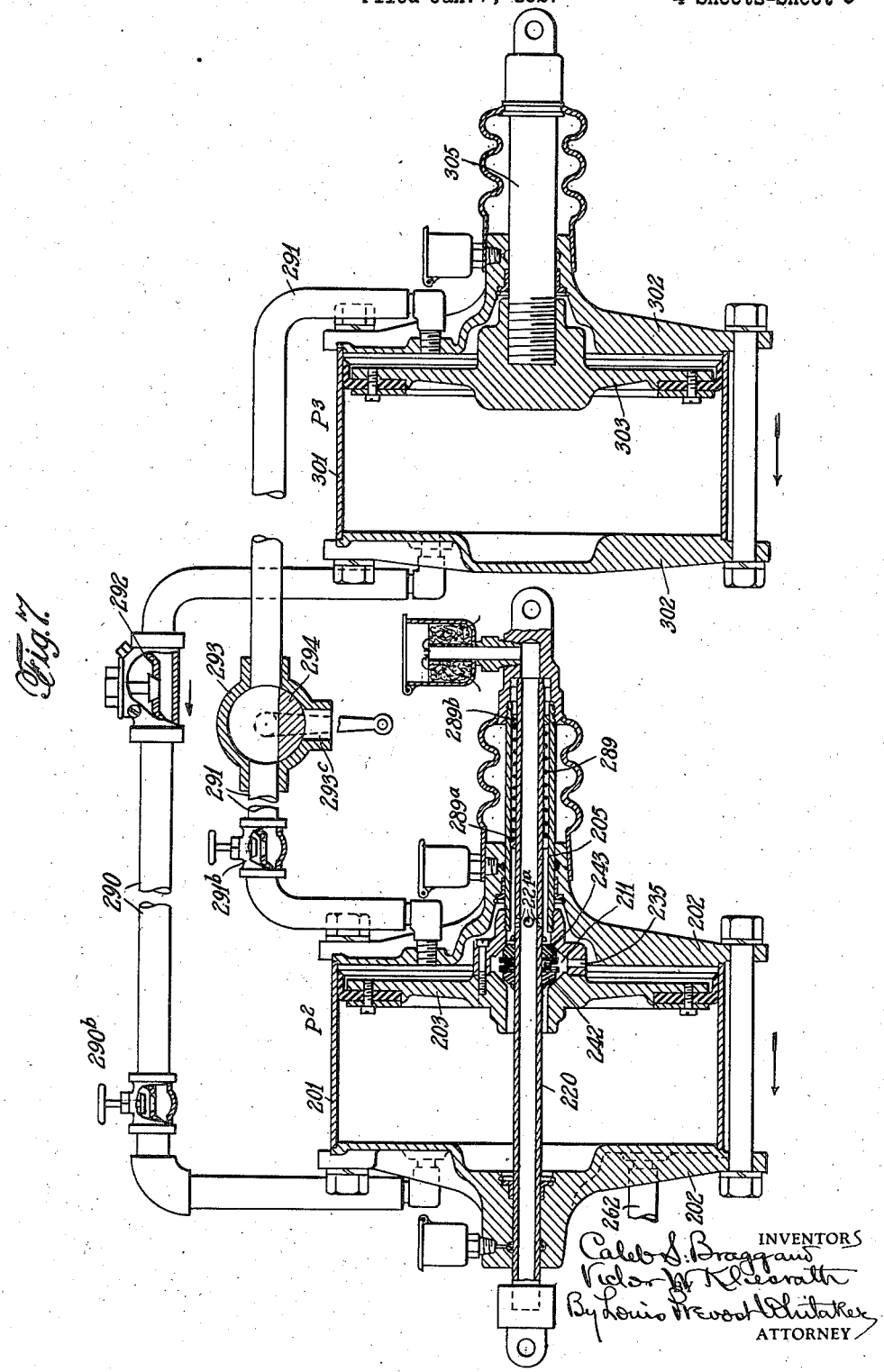

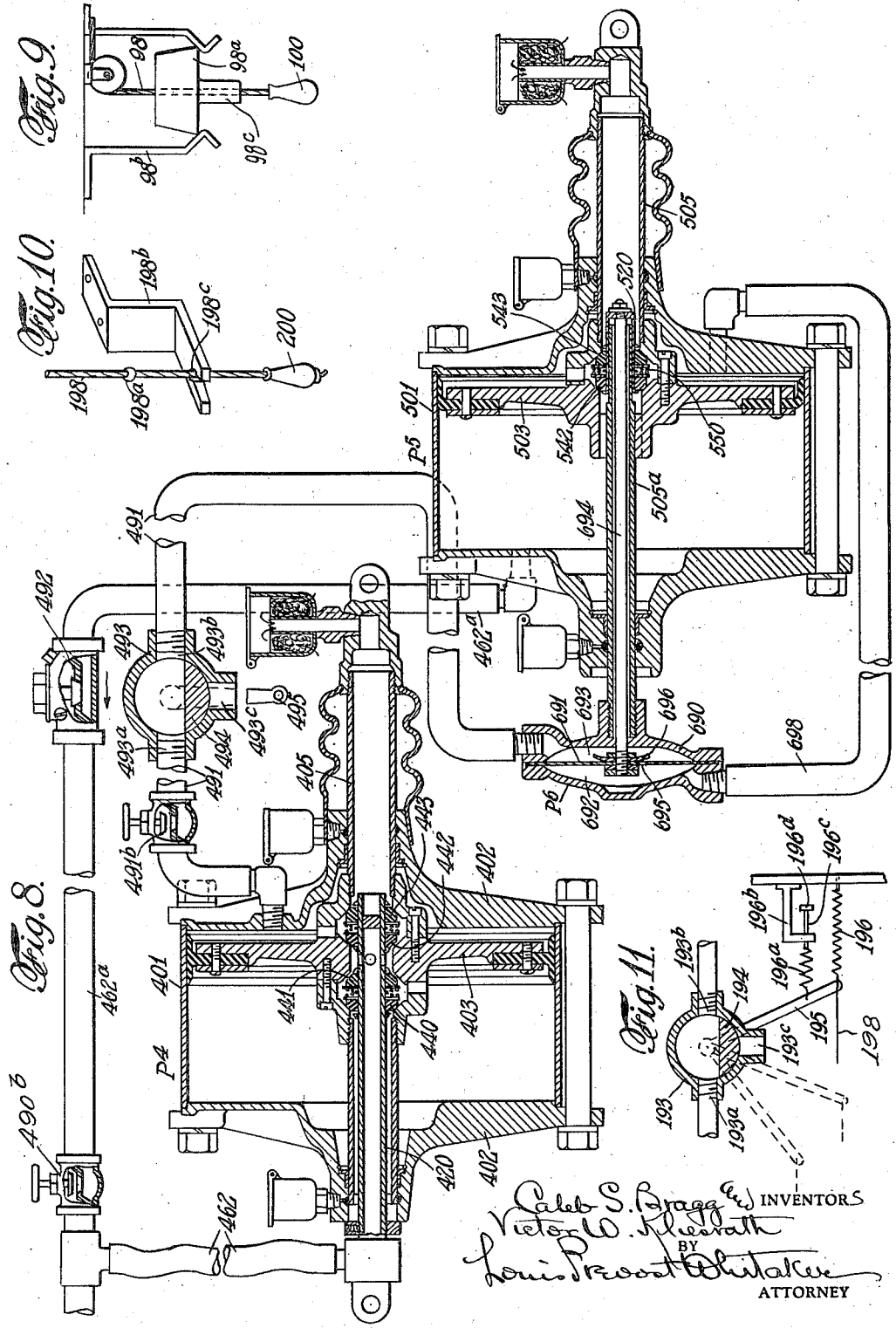

1,650,487

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

BRAKE MECHANISM FOR AUTOMOTIVE VEHICLES.

Application filed January 7, 1927. Serial No. 159,763.

Our invention consists in the novel features hereinafter described, reference being had to the accompanying drawings which show several forms in which we have contemplated embodying our invention, and the said invention is fully disclosed in the following description and claims.

Our invention is an improvement in brake mechanism for automotive vehicles, and is adapted particularly to installations in which a main power actuator provided with controlling valve mechanism and operated by differential pressures, preferably rarefaction or suction, obtained by connection with the intake manifold of the internal combustion engine which propels the vehicle, and air at atmospheric pressure is employed to operate the brake mechanism of a main automotive vehicle, which also propels a trailer or trailers provided with separate brake mechanisms operated by an auxiliary power actuator capable of being controlled by the valve mechanism of the main power actuator carried by the main vehicle, through suitable pipe connections for the purpose of simultaneously applying the brakes of the main vehicle and trailer or trailers. In installations of this kind, our experience has shown that it is desirable to do as much of the braking as possible on the wheels of the trailer, when heavily laden trailers are being drawn in order to prevent what is termed "jack-knifing." If the application of the brakes simultaneously to a main automotive vehicle, which we will herein term the "tractor", and a trailer has the effect of slowing down the tractor more rapidly than the trailer, as where the trailer is very heavily laden, the trailer will run up on the tractor until arrested thereby, and the push of the trailer against the rear end of the tractor frequently causes the tractor to skid, that is, its rear wheels slip sideways on the roadway, which naturally directs the trailer toward the side of the road in the same direction and produces what is termed "jack-knifing".

Another serious difficulty with the use of power brakes on tractor and trailer is that if the brakes are sufficiently powerful to hold the retrailer when fully loaded, they will act too powerfully when the trailer is carrying a light load or none at all, as the trailer itself is usually much lighter than the tractor, and frequently weighs less than 25% of the load which it is capable of carrying, while the weight of the tractor is generally equal to and in many cases greater than its normal load, therefore, if the power brakes on the trailer and tractor are adequate to stop them when fully loaded, if both brakes are applied when both the tractor and trailer are empty, with sufficient power to make a normal stop of the tractor, the wheels of the trailer will skid, and the rear end of the trailer may swing sideways with respect to the roadway. In either of the cases before mentioned an accident is liable, and on wet pavements almost inevitable.

The object of our present invention is to provide an installation of this general character for operating brake mechanism of tractor and trailer, whereby the operator may at his option effectively apply the brake mechanism of the trailer independently of the brake mechanism of the tractor to effect normal braking operations, and especially when the tractor is heavily laden, and may apply the brake mechanism of the tractor alone when desired, especially when the trailer is empty or light, and may also simultaneously apply the brake mechanisms of both tractor and trailer whenever desired. This result is conveniently accomplished in the embodiments of our invention herein shown and described, by providing auxiliary valve mechanism controlled by the operator independently of the valve mechanism for the main actuator, whereby the main and auxiliary actuators may be operatively coupled for joint and simultaneous operation to apply the brakes of both vehicles, or may be separated to permit of the separate operation of either the main actuator under the control of its reversing valve mechanism to apply the brakes of the tractor, or a separate operation of the auxiliary actuator under the control of the said auxiliary valve mechanism to apply the brakes of the trailer.

Our invention also comprises the novel features of construction and combination of parts hereinafter fully described and particularly pointed out in the claims.

Referring to the accompanying drawing,

Fig. 1 is a diagrammatic view representing an installation of our improved brake mechanism in a main automotive vehicle or tractor, and a trailing vehicle.

Fig. 2 is a detail view showing in elevation a main or master power actuator and an auxiliary power actuator, and connections between them including one form of auxiliary valve mechanism, parts of the connecting pipes being broken away.

Fig. 3 is a detail sectional view of the auxiliary valve mechanism shown in Figs. 1 and 2, and showing the valve in its normal or off position, placing the main and auxiliary actuators in communication for joint operation under the control of the valve mechanism of the main actuator.

Fig. 4 is a similar view showing the auxiliary valve in an intermediate position in which the main and auxiliary actuators are cut off from each other.

Fig. 5 is a similar view showing the auxiliary valve in a third position, in which the auxiliary actuator is connected with the atmosphere for operating it independently of the main actuator.

Fig. 6 is an enlarged detail sectional view of the main valve controlled actuator and an auxiliary valveless actuator, and their connections including the auxiliary valve mechanism shown in the preceding figures, the main actuator having a double acting piston, and the auxiliary actuator having a single acting piston, both pistons being normally submerged in vacuum.

Fig. 7 is a view similar to Fig. 6, in which both actuators are shown provided with single acting pistons, both of which are normally submerged in vacuum.

Fig. 8 is a view similar to Figs. 6 and 7, in which the auxiliary actuator is shown provided with independent controlling valve mechanism actuated by a fluid pressure operated device interposed in the pipe connections between the auxiliary valve mechanism and the auxiliary actuator.

Fig. 9 is a detail view illustrating one means for securing the auxiliary valve in its intermediate position.

Fig. 10 is a similar view illustrating another device for the same purpose.

Fig. 11 is a sectional view similar to Fig. 3, showing a slightly modified form of retracting mechanism for the auxiliary valve.

Referring to Fig. 1 of the drawings, A represents a main automotive vehicle, diagrammatically indicated by dotted lines, which may be for example a motor truck, or the like, and will be hereinafter referred to as the tractor. B indicates a trailing vehicle having two or more wheels, the trailer being also indicated diagrammatically by dotted lines. The tractor is provided with an internal combustion engine indicated at 60, for propelling both vehicles, which will be coupled together in any usual or preferred manner. The engine is provided with the usual intake manifold indicated at 61, suction passage, 66, carburetor, 65, and throttle valve, 64. The tractor is also provided with suitable brake mechanism which may be of any desired type, and arranged to apply the brakes to two or more wheels. For purposes of illustration we have shown in the diagram Fig. 1, a diagrammatic representation of the brake mechanisms for the rear wheels of the tractor indicated at $a, a^1$, each of which comprises in this instance a brake drum, 70, brake band, 71, brake operating lever, 72, and retracting spring indicated at 73, the brake levers, 72, being each connected by a link, 74, with an arm, 75, on a common rock shaft, 76, provided with an operating arm, 77, adapted to be operated by the main or master power actuator indicated as a whole at P, under the control of its valve mechanism which is operated by a foot lever, 88, or other operator operated part provided with the usual retracting sping, 89, means being povided whereby the piston of the main or master actuator and brake mechanism connected therewith, may have applied to them the physical force of the operator through the lever, 88, in addition to the power of the actuator, P, or for the purpose of operating the brakes of the tractor entirely by the physical force of the operator in case of failure of power for any reason. The trailer, B, is also provided with independently operated brake mechanism of any usual or desired type for two or more of its wheels, and in this instance for purposes of illustration we have shown the tractor provided with two brake mechanisms illustrated at $b, b^1$, each of which is shown as being in the same form as the brake mechanism illustrated in connection with the tractor, and given the same reference characters. The brake levers of the brake mechanisms, $b$ and $b^1$, are shown in this instance as connected by links, $74^1$, with arms, $75^1$, on a rock shaft, $76^1$, having an operating arm, $77^1$, operatively connected with an auixilary power actuator mounted on the trailer and indicated at $P^1$, and being in this instance a valveless actuator operatively connected with the main or master power actuator, P, and controlled by the valve mechanism of the latter, through suitable pipe connections hereinafter described.

As illustrated in Fig. 6, the main power actuator, P, is shown in this instance as being provided with a double acting piston, and is constructed and operates substantially in accordance with the power actuator shown and described in our former application for Letters Patent of the United States, filed October 20, 1925, and given Serial No. 63,697. The specific construction of this actuator and the valve mechanism therefor forms no part of our present invention, but will be briefly described in order that our present invention may be clearly understood. The main or master power actuator comprises a cylinder 1, closed at its opposite ends by heads, 2, 2, and provided with a double acting piston, 3, having oppositely extending hollow piston rods, 5, 5ª, communicating with the atmosphere at their outer ends, the piston rod, 5, being provided with an air strainer indicated at 5ᵇ, and the exposed portion thereof being covered with a flexible and extensible corrugated member, 5ᶜ. The piston hub is provided with a centrally located suction chamber, 17, on opposite sides of which are valve chambers, 11 and 12, each communicating with the interior of the cylinder on one side of the piston by ports indicated at 34 and 35 respectively. Within each valve chamber is a pair of oppositely disposed valves indicated at 40, 41, 42 and 43, of which the valves, 41 and 42, are suction valves for controlling the connection between the suction chamber and the respective valve chambers, while the valves, 40 and 43, are air inlet valves controlling the communication between the respective valve chambers and the adjacent hollow piston rods. A hollow valve actuating sleeve, 20, extends through the hollow piston rod, 5ª, and through the piston, and through all of the said valves, and is provided with collars for engaging the valves in such manner that a movement of said sleeve longitudinally in either direction will move the inlet valve of one pair and the suction valve of the other pair in a direction to open the same. The hollow sleeve, 20, communicates with the suction chamber, 17, by apertures, 21, and is closed at its inner end as by a plug, 22, and said sleeve is connected with a source of suction by a suction pipe, 62, a portion of which adjacent to the sleeve is flexible, and which extends in this instance to and is connected with the intake manifold of the engine between the throttle valve and the engine cylinders. The suction pipe is shown provided with a check valve, 62ᵇ, for the purpose of maintaining in the actuator cylinders the maximum rarefaction which is obtained in the intake manifold between operations of the actuators, and said suction pipe may also be provided with an adjustable regulating or restricting valve, 62ª, if desired, to regulate the rapidity with which air withdrawn from the actuators may be delivered into the intake manifold, to prevent the possibility of stalling the engine if idling, or materially interfering with its operation. The valve actuating sleeve, 20, is provided with an adjustable stop collar indicated at 23, for engaging the end of the cylinder when the piston is in retracted position, to normally hold both of the suction valves, 41 and 42 partly open as shown, thereby connecting the cylinder on both sides of the piston normally with the intake manifold, and maintaining the piston normally submerged in vacuum. The oppositely disposed valves of each pair are held seated by springs or other yielding cushioning devices indicated at 50, and the valves themselves are preferably made of molded rubber or other suitable materials, and provided with central apertures fitting the sleeve, 20, sufficiently tightly to make an air tight joint while permitting the movement of the sleeve therethrough. It will thus be seen that the valve mechanism including the sleeve, 20, moves with the piston, and that the sleeve, 20, is also capable of movement with respect to the piston for the purpose of actuating the valve mechanism. Means are provided for limiting the relative movement between the sleeve, 20, and the piston. In this instance the sleeve is shown provided with a collar, 44, located between an inwardly projecting collar, 45, with which the piston rod, 5, is provided, and the outer end of a recess, 46, in a fitting, 47, screwed or otherwise connected to the outer end of the piston rod, and provided with means for attaching it to the brake mechanism. The piston rod, 5, is shown connected by a link, 78, with the operating arm, 77, of the brake mechanism for the tractor, and the sleeve, 20, is shown connected by a link, 24, with the foot lever, 88, having a retracting spring, 89. It follows from the construction described that after the foot lever, 88, has been moved far enough to operate the valve mechanism, that further movement of the foot lever will bring the collar, 44, of the sleeve, 20, into engagement with the collar, 45, on the piston rod, 5, and permit the operator to add his own physical force to that of the actuator, if the latter is operating, or to move the piston and the brake mechanism connected therewith by his physical force alone, in case of failure of power. This provision for limiting the lost motion between the valve actuating sleeve and the piston also protects the valve mechanism from injury.

The auxiliary actuator, P¹, is shown in Fig. 6 as a valveless actuator, comprising a cylinder, 101, closed at each end by heads, 102, and having a piston 103, provided with a piston rod, 105, which is connected by a link, 78¹, with the arm, 77¹, of the brake mechanism for the trailer.

The portions of the cylinders, 1 and 101, on the forward sides of their respective pistons are shown connected by a pipe, 90, and the portions of the said cylinders in rear of their respective pistons are likewise connected by a pipe, 91. The portions of these pipes which extend from the tractor to the trailer will be provided with the usual flexible portions, 90ª and 91ª, as indicated in Fig. 1, and the pipe, 90, adjacent to the auxiliary actuator cylinder is preferably provided with a check valve indicated at 92, adapted to open in the direction of the arrow adjacent thereto. As has been heretofore stated, a partial vacuum is normally maintained in the main actuator cylinder on both sides of the piston, and it will therefore follow, assuming that the pipes, 90 and 91, operatively connect the corresponding portions of the main and auxiliary actuator cylinders, the air would likewise be exhausted from the auxiliary actuator cylinder on both sides of its piston, and the auxiliary actuator piston will also be normally maintained in vacuum. It will also be seen that, assuming that the pipe, 91, is in open communication with the main and auxiliary actuator cylinders, the operation of the controlling valve mechanism for the main actuator to produce a power stroke of the piston, 3, by the admission of atmospheric air to the cylinder, 1, in rear of the piston, would have the effect of likewise admitting atmospheric air to the auxiliary actuator cylinder in rear of the piston, to produce a corresponding movement of the piston, 103, therein, and that when the valve for the main actuator is reversed to again connect the main actuator cylinder in rear of the piston with the suction pipe, and admit air forward of the piston, the air formerly admitted to the auxiliary actuator cylinder in rear of the piston will be drawn out through pipe, 91, (without however admitting air through pipe, 90, to the auxiliary actuator cylinder forward of the piston, which is prevented by the check valve) thus positively returning the main actuator piston and permitting the auxiliary actuator piston to be returned by the draft of the brakes and their retracting means. The check valve, 92, will serve to maintain the vacuum in the auxiliary actuator forward of the piston, if the trailer breaks loose from the tractor and assists in automatically applying the trailer brakes under those conditions, and also preserves the vacuum forward of the auxiliary actuator piston when the main actuator piston, if double acting, is being returned by power, so that the brakes on the trailer can always be operated by the auxiliary valve mechanism, hereinafter described, regardless of the movements of a double acting master cylinder.

In Figs. 1, 2 and 6, we have shown an auxiliary controlling valve mechanism consisting in the present instance of a three way valve, comprising a valve casing, 93, provided with oppositely disposed ports or openings, $93^a$, $93^b$, to which portions of the pipe, 91, are connected, and having a laterally disposed port or opening, $93^c$, communicating with the atmosphere, and a valve proper indicated at 94, mounted to rotate in the valve casing in this instance, and capable of being moved into the three positions indicated in Figs. 3, 4 and 5. In the normal position of the valve indicated in Fig. 3, the air inlet port, $93^c$, is closed, and the valve provides a free passage between the opposite ports, $93^a$ and $93^b$, placing the portions of the cylinders, 1 and 101, of the main and auxiliary actuators in rear of the pistons therein in direct communications, thus permitting both actuators to be operated substantially simultaneously under the control of the valve mechanism of the main or master actuator, to apply the brakes of the tractor and trailer. By rotating the valve, 94, in a clockwise direction, the valve may be moved into the intermediate position indicated in Fig. 4, in which the air inlet port, $93^c$, is still closed, and the port, $93^a$, communicating with the main actuator cylinder is also closed. This has the effect of separating the rear end portions of the two cylinders from each other, and when the valve is in this intermediate position the operation of the controlling valve mechanism of the main actuator would produce the operation of the main actuator only, without any accompanying operation of the auxiliary actuator, thus permitting for example the brakes of the tractor to be applied independently without applying the brakes of the trailer. By further moving the valve, 94, in a clockwise direction, the air inlet port, $93^c$, may be placed in communication, to a greater or less extent with the port, $93^b$, communicating with the auxiliary actuator cylinder, 101, in the rear of the piston therein, the port, $93^a$, communicating with the main actuator cylinder being closed, as shown for example in Fig. 5. This position of the valve admits atmospheric air to the auxiliary actuator in rear of its piston without admitting air to the rear end of the main actuator, and as rarefaction in the portion of the auxiliary actuator cylinder forward of the piston is maintained by the check valve in pipe, 90, the auxiliary actuator piston will be immediately operated in the direction indicated by the arrows in Fig. 6, to effect the application of the brakes of the trailer entirely independently of the brake mechanism of the tractor, and without operating the latter.

We provide means within reach of the driver or operator of the tractor for operating the auxiliary controlling valve mechanism independently of the foot lever, 88, or other operator operated device, which controls the valve mechanism of the main actuator. In this instance the rotary valve, 94, is provided with an operating arm, 95, and a retracting spring, 96, adapted to hold the valve in its normal position indicated in Figs. 3 and 6, and which may be determined for example by a stop, 97, on the valve casing, as indicated in Fig. 2, or in any other desired manner. In Fig. 1, the arm, 96, is shown provided with a flexible connection, 98, passing around pulleys, 99, to a position convenient to the driver's seat, as for example in the cab, $a^2$, of the tractor, indicated in dotted lines in Fig. 1, where said flexible connection may be provided with a suitable handle, 100.

When the operator desires to operate the brakes of the trailer without operating the brakes of the tractor, he may pull on the handle and flexible connection so as to rotate the valve, 94, through the intermediate position to the position indicated in Fig. 5, thereby closing communication with the rear end of the main actuator cylinder, through the pipe, 91, and admitting air to the auxiliary actuator cylinder in rear of the piston, and effecting a movement of the auxiliary actuator piston to apply the trailer brakes to the desired extent. By partially releasing the handle, 100, and permitting the retracting spring, 96, to return the valve to the intermediate position indicated in Fig. 4, the braking effect of the auxiliary actuator may be retained as long as desired. By fully releasing the handle, 100, and permitting the retracting spring, 96, to return the valve, 94, to its normal position, communication will be re-established between the main and auxiliary cylinders in rear of the pistons therein and pressures will be immediately equalized within the auxiliary cylinder on both sides of the piston therein, as the air previously admitted to the auxiliary actuator cylinder to operate its piston will be withdrawn therefrom into the main actuator cylinder on both sides of the piston therein, and therefrom into the suction passage to the manifold, leaving both pistons submerged in vacuum as before and permitting the trailer brakes to relieve themselves by the draft of the applied brakes and their retracting means. It will also be seen that the power stroke of the auxiliary actuator piston is produced entirely by admitting air in the rear of it as rapidly as desired without admitting any appreciable quantity of air to the intake manifold so there is no danger of interfering with the carburation or stalling the motor, if idling. The admission of air to the manifold from the auxiliary cylinder occurs only during the return movement of the auxiliary piston and the brake mechanism connected therewith, and the flow of air may be restricted by valve, 62ª, so as not to interfere with the carburation or stall the motor, if idling.

If the operator desires to operate the brake mechanism of the tractor alone, without operating the brakes of the trailer, he can pull on the flexible connection, 98, sufficiently to move the auxiliary controlling valve, 94, into the intermediate position shown in Fig. 4, thus effectually closing the pipe, 91, and also the air inlet aperture, 93ᶜ, and simultaneously depress the foot lever, 88, thereby permitting the suction valve, 42, of the main actuator to close, further opening the suction valve, 41, and continuing the communication between the forward portion of the cylinder, 1, and the suction pipe, 62, and opening the air inlet valve, 43, to admit atmospheric air to the cylinder, 1, in rear of the piston, 3. This will produce a movement of the piston, 3, in the direction of the arrow in Fig. 6, to apply the brakes of the tractor to the desired extent, determined by the extent to which the operator depresses the foot lever, 88, the said foot lever and the valve sleeve, 20, moving forward with the piston, 3. As soon as the forward movement of the foot lever, 88, ceases, a slight continued forward movement of the piston, 3, with respect to the sleeve, 20, will permit the air inlet valve, 43, to close and hold the brakes applied. An application of the trailer brakes may be subsequently made by either pulling on the handle, 100, or admitting atmospheric air into the rear of the auxiliary cylinder, or by releasing the handle and placing the rear of the auxiliary cylinder in communication with the rear of the master cylinder and permitting the atmospheric air to pass to the rear of the auxiliary cylinder from the rear of the master cylinder. This will reduce the pressure in the master cylinder in the rear of the master piston, and the pistons will be pulled slightly rearwardly by the load of the applied brakes, opening atmospheric valve, 43, supplying the full amount of air required to reapply the tractor brakes to the extent of a previous application without the necessity of the operator moving the foot lever. To partially release the tractor brakes, the operator may by slightly releasing the foot lever effect a partial opening of the suction valve, 42, without closing the suction valve, 41, thereby producing an equalization of pressures in the cylinder, 1, on the opposite faces of the piston, and permitting the tractor brakes to relieve themselves by their draft and their retracting means. The tractor brakes can be reapplied as often as desired by a slight forward movement of the foot pedal, 88, and may be released altogether by releasing the foot lever and permitting its retracting spring to shift the sleeve, 20, rearwardly with respect to the piston, 3, so as to close the suction valve, 41, and open the air inlet valve, 40, which will immediately return the piston to its retracted position, and restore the tractor brake mechanism connected therewith to its normal position. Check valve, 92, will prevent the air forward of the piston of the master cylinder from passing into the forward portion of the auxiliary cylinder, thereby maintaining the vacuum in the auxiliary cylinder forward of the piston so that the trailer brakes may be applied by the handle, 100. Just before the main actuator piston, 3, comes to rest in retracted position, the stop collar, 23, on the sleeve, 20, engages the head, 2, of the cylinder, 1, and restores the valves to their normal position, in which the suction valves, 41 and 42, are both partly opened, effecting an equalization of pressures on opposite sides of the piston and withdrawing the air from the cylinder on both sides of the piston, leaving the piston submerged in vacuum.

In order to avoid the necessity of having the operator or driver hold the handle, 100, or cord, or flexible connection, with the auxiliary controlling valve in its intermediate position during operation of the tractor brake mechanism alone, we prefer to provide means for holding the valve in an intermediate position. Any desired locking means may be employed, and in Figs. 1 and 9 for example, we have shown one means for accomplishing this result, in which the flexible connection, 98, is provided with a counterbalance weight, 98$^a$, provided with a handle, 98$^c$, and having an aperture loosely engaging the flexible connection, which weight will be sufficient when in engagement with the handle, 100, to counterbalance the retractive force of the spring, 96, when the valve, 94, is in the intermediate position shown in Fig. 4. This weight may be provided with stationary spring clips indicated at 98$^b$, in Fig. 9, to support the weight, 98$^a$, out of engagement with the handle, 100, when it is not desired to lock the valve, 94. In Fig. 10 we have shown another arrangement for the same purpose, in which the flexible connection here indicated at 198, is provided with an enlargement, 198$^a$, which, when it has been drawn down far enough to bring the valve, 94, into its intermediate position, may then be removed to one side to engage a notch, 198$^c$, in a bracket, 198$^b$.

The means for locking the valve in the intermediate position may be employed with special benefit for example, where it is desired to do the braking continuously on the wheels of the tractor by means of the master actuator without operating the auxiliary actuator or the trailer brakes, as the valve may be locked in the intermediate position which disconnects the auxiliary actuator from the control of the valve mechanism of the master actuator. It may also be employed as before stated, when it is desired to hold the braking pressure on the brakes of the trailer alone, after an application of the trailer brakes by means of the auxiliary controlling valve mechanism as previously described, for example, where the vehicles are descending long easy grades with a heavily loaded trailer, and the brakes of the trailer sufficiently retard the forward movement of both vehicles. Whether such a locking mechanism for the purpose described is or is not employed, it is desirable that the operator, in effecting the operation of the auxiliary controlling valve, may be able to determine exactly when the valve, 94, is in the intermediate position. In Fig. 11, we have shown a slightly modified construction for accomplishing this purpose. In this figure the valve is indicated at 194, and the other parts thereof are given the same reference characters as in Fig. 6, with 100 added. The valve operating arm, 195, is provided with the main retracting spring, 196, which is operated at all times to return the valve to its normal position indicated in full lines in Fig. 11. In this instance we have also provided the arm, 195, with a second retracting spring, 196$^a$, secured at one end to the arm, and connected at the other end to a bracket, 196$^b$, by means permitting a certain amount of loss motion sufficient to permit the arm, 195, to move far enough to bring the valve into its intermediate position before the force of the second retracting spring begins to be felt. In this instance the spring, 196$^a$, is connected with sliding pin, 196$^c$, loosely engaging an aperture in the bracket, 196$^b$, and provided with a head, 196$^d$, which is brought into engagement with the bracket as soon as the arm, 195, has been moved far enough to bring the valve, 194, into its intermediate position, cutting off the auxiliary actuator cylinder from the main actuator cylinder. The further movement of the valve to open the air port here indicated at 193$^c$, will be resisted by the tension of both springs, and the increased resistance will enable the operator or driver to know just when the valve has been brought into the intermediate position. If desired, the spring, 196$^a$, may be made considerably stronger than the spring, 196.

We prefer to provide the check valve, 92, indicated in Fig. 1, in the pipe, 90, between the flexible portion, 90$^a$, and the actuator cylinder, so that should the coupling between the vehicles become detached accidentally, which would result in the trailer breaking loose from the tractor and fracturing or disconnecting the flexible portions, 90$^a$ and 91$^a$, of the connecting pipes, 90 and 91, the check valve, 92, would instantly close, preserving the vacuum in the auxiliary actuator cylinder forward of the piston, and permitting air to rush into the cylinder in rear of the piston, and thereby instantly apply the brakes of the trailer and bring it to a stop, thus avoiding a possible and perhaps serious accident.

While we have shown in the figures previously referred to an embodiment of our invention in which the master actuator cylinder is provided with a double acting piston, the invention is equally applicable to a construction in which the master cylinder is provided with a single acting piston. Such a construction is shown in Fig. 7, in which P$^2$ represents the master actuator, of the kind shown in our former Patent No. 1,583,117, dated May 4, 1926, for example, and P$^3$ represents the auxiliary actuator, which are operatively connected to the brake mechanisms of the tractor and trailer in the same manner as that previously described, the cylinders of said actuators being connected by the pipes, 290 and 291, in exactly the same manner as hereinbefore described, the pipe, 291, being provided with the auxiliary valve mechanism, and the corresponding parts in this figure being given the same reference numerals used in Figs. 1 to 6 inclusive, with 200 added. The only difference between this construction and that shown in Fig. 6, for example, is that the piston, 203, of the main actuator is provided with a single valve chamber, 211, containing a suction valve, 242, and an air inlet valve, 243, the suction valve controlling an annular passage communicating with the cylinder forward of the piston, the suction pipe, 262, leading to the intake manifold being connected in this instance directly to the cylinder, 201, forward of the piston. The piston, 203, is also provided with only one piston rod, 205, through which air may be admitted to the valve chamber, 211, when the inlet valve, 243, is opened, passing thence to the cylinder in rear of the piston through the port, 235, and thence through the pipe, 291, if the auxiliary controlling valve, 294, is in its normal position as shown to the auxiliary actuator cylinder, 301, in rear of the piston therein. In this instance we have also shown a retracting spring indicated at 289, for the valve actuating sleeve, 220, of the main actuator, surrounding said sleeve and interposed between a collar, 289$^a$, on the interior of the hollow piston rod, and a collar, 289$^b$, on the exterior of the sleeve, and normally forcing the sleeve, 220, to the rearmost position permitted by its limited relative movement with respect to the piston, when the piston is in retracted position, thus maintaining the suction valve, 242, normally slightly opened, as shown in Fig. 7, and thereby placing the portion of the main actuator cylinder in rear of the piston, and the corresponding portion of the auxiliary actuator cylinder, in communication with the intake manifold through the suction pipe, 262, and normally maintaining both pistons submerged in vacuum.

It follows from this construction that when the operator depresses the foot lever connected with the valve actuating sleeve, 220, the sleeve will move forward in the direction of the arrows in Fig. 7, permitting the suction valve, 242, to close, and opening the air inlet valve, 243, admitting air in rear of both main and auxiliary pistons, assuming the valve, 294, to be in normal position, and applying the brakes of both the tractor and trailer, without admitting appreciable quantities of air to the intake manifold. When it is desired to return the pistons and brake mechanisms to normal position, the operator will release the foot lever, permitting the spring, 289, to shift the valve sleeve, 220, rearwardly, closing the air inlet valve and opening the suction valve of the main actuator, effecting an instantaneous equalization of pressures in the main actuator cylinder, accompanied by a similar instantaneous equalization of pressures in the auxiliary actuator cylinder, permitting the brake mechanisms of both vehicles to relieve themselves instantly, and as both cylinders are thus connected with the suction pipe, 262, on both sides of each piston, the air previously admitted will be withdrawn and permit the pistons and the brake mechanisms connected therewith to be returned to normal position by the retracting means for the brake mechanisms.

By moving the auxiliary controlling valve, 294, into intermediate position, the master actuator and the brake mechanism connected therewith may be operated by the foot lever without operating the auxiliary actuator and by moving the valve, 294, so as to connect the auxiliary actuator cylinder with the air inlet port, 293$^c$, the operation of the auxiliary actuator and trailer brakes can be effected without operating the master actuator, as previously described with reference to Figs. 1 to 6. In this form of the invention also, the operator can apply his physical force to the master actuator piston and the brake mechanism connected therewith, and can operate them by physical force alone in case of failure of power.

In the embodiments of our invention hereinbefore described, we have shown the auxiliary actuator as a valveless actuator, but our inventon is equally applicable in installations in which the auxiliary actuator for operating the trailer brakes is provided with controlling valve mechanism of its own, actuated by a pressure operated device connected by suitable piping with the main and auxiliary actuator cylinders, so that the valve mechanism of the auxiliary actuator is operated by the valve mechanism for the main or master actuator through said pressure operated device, as set forth in our former application for Letters Patent of the United States, filed August 30, 1926, and given Serial No. 132,364.

In Fig. 8 we have illustrated an embodiment of our present invention, in which the type of auxiliary valved actuator and pressure operated device therefor, described in our said former application, is employed. In this figure, P$^4$, represents the main actuator connected with the brake mechanism of the tractor, and corresponding exactly in this instance to the actuator, P, shown in Fig. 6. The various parts are given the same reference numerals with the addition of 400, and it will be unnecessary to again describe either the construction or the operation of this actuator.

P⁵ represents an auxiliary valved actuator of the kind illustrated in our former application for Letters Patent of the United States filed August 30, 1926, and given Serial No. 132,364, the controlling valve for the auxiliary actuator being operated by means of a pressure operated device indicated at P⁶. The specific details of this auxiliary actuator are not herein claimed, and will only be briefly described in order that our present invention, in its relation thereto, may be clearly understood.

The actuator, P⁵, comprises the cylinder, 501, and piston, 503, which is provided with a suction valve, 542, and air inlet valve, 543, constructed and operating substantially in the same manner as the valves, 242 and 243 in Fig. 7, except as to their manner of actuation. The piston is provided with the hollow piston rod, 505, adapted to be connected with and to operate the brake mechanism of the trailer. The piston is also provided with a piston rod, 505ª, extending through the opposite head of the cylinder, and carrying on its outer end the pressure operated device. The actuator, P⁵, is shown provided with a single acting piston, and the pressure operated device in this instance comprises a shell, 690, having a flexible diaphragm, 691, dividing it into two compartments, 692 and 693, the compartment, 692, being connected by a pipe, 698, with the cylinder, 501, in rear of the piston. A valve actuating rod, 694, is connected with the diaphragm, 691, and extends through the hollow piston rod, 505ª, and through the piston, and is connected to a valve actuating sleeve, 520, movable on an extension of the piston rod, 505ª, and carrying the valves, 542 and 543, which are normally held seated by interposed cushioning springs, or other yielding devices. The diaphragm is also shown provided with an aperture, 695, which connects the chambers, 692 and 693, when opened, but which may be closed by a check valve indicated at 696 in the form of a flap valve. In an installation similar to Fig. 1, in which the main and auxiliary actuators, P⁴ and P⁵, are employed, the suction pipe of the intake manifold will be connected to the valve actuating sleeve, 420, of the main actuator, as indicated at 462 in Fig. 8, and the piston rod, 405, will be connected with the brake mechanism for the tractor. The cylinder, 401, of the main actuator, on the rear side of its piston, is connected by a pipe, 491, with the pressure operated device, P⁶, and communicates with the chamber, 693, in rear of the diaphragm. In this communicating pipe, 491, is located the auxiliary controlling valve, 494, with its casing, 493, connected by the ports, 493ª and 493ᵇ, with portions of the pipe, 491, and having an air inlet port, 493ᶜ. The valve, 494, is shown in its normal or fully retracted position in Fig. 8. The auxiliary actuator cylinder, 501, is also connected on its forward side directly with the intake manifold of the engine, for example, by a branch suction pipe, 462ª, which is shown broken away in Fig. 8, intermediate portions thereof being indicated in dotted lines to avoid confusion. This branch suction pipe is also provided with a check valve, 492, to maintain the rarefaction in the forward side of the auxiliary actuator cylinder in case the vehicles break away from each other.

The operation of this embodiment of our invention will be very similar to that of the apparatus illustrated in Fig. 6, except for the important difference that the air admitted under atmospheric pressure to the auxiliary actuator, P⁵, for actuating it will be admitted by the opening of its own air inlet valve, 543, and will not have to traverse the piping intervening between the two actuators, thus avoiding any possibility of lag in the operation of the auxiliary actuator. Assuming that the parts are in the position shown in Fig. 8, and the engine is running, the air will be exhausted from the main actuator cylinder through the suction pipe, 462, on both sides of the main actuator piston, 403, the suction valves, 441 and 442, being normally opened as shown. The branch suction pipe, 462ª, will also exhaust the air from the auxiliary actuator cylinder, 501, on the forward side of the piston. The auxiliary valve, 494, being in the position shown, the portion of the main actuator cylinder in rear of the piston will be in communication with the chamber, 693, of the pressure operated device, P⁶, through the pipe, 491, thereby exhausting the air therefrom, maintaining the check valve, 696, in open position, and exhausting the air from the auxiliary cylinder in rear of the piston through the pipe, 698, and the chamber, 692. In the normal position of the parts, therefore, both pistons will be submerged in vacuum. The brakes of the tractor and trailer can be substantially simultaneously applied by the operation of the foot lever in the manner hereinbefore described, to effect the further opening of suction valve, 441, the closing of suction valve, 442, and the opening of air inlet valve, 443, to admit air in rear of the main piston, 403, the increase in pressure therein being transmitted to the chamber, 693, of the pressure operated device, closing the check valve, 696, and effecting a longitudinal movement of the rod, 694, to open the air inlet valve, 543, and admit atmospheric air directly from the hollow piston rod, 505, to the auxiliary actuator cylinder in rear of the piston thereof, so that the substantial simultaneously operation of the tractor and trailer brakes with equal pressure may be secured under the control of the valve mechanism of the main actuator. By moving the valve, 494, into the intermediate position illustrated in Fig. 4, the main actuator may be operated by the foot lever to apply the brakes of the tractor only. By moving the auxiliary controlling valve, 494, into the position indicated in Fig. 5, the portion of the pipe, 491, leading to the main actuator will be closed, and the portion of the pipe, 491, leading to the pressure operated device, P⁶, will be placed in connection with the air inlet port, 493ᶜ, thereby closing the check valve, 696, operating the diaphragm and actuating the valve mechanism of the auxiliary actuator, to admit air in rear of the piston thereof. When the valve, 494, is returned to normal position, the pipe, 491, will be again placed in communication with the suction pipe, 462, through the valve mechanism of the main actuator, and the air admitted in rear of the auxiliary piston, 503, will be withdrawn through the aperture, 695, in the diaphragm, permitting the trailer brake mechanism to instantly relieve itself, and permitting the piston, 503, and the trailer brake mechanism to return to their normal positions under the action of their retracting springs. In other words the operation of the auxiliary controlling valve mechanism will be exactly the same as that described with reference to the construction shown in Figs. 6 and 7, in so far as the control of the brake mechanism is concerned, except that in the construction shown in Fig. 8, the auxiliary actuator, P⁵, is provided with its own valve mechanism actuated by a pressure operated device with which the auxiliary valve mechanism is connected.

Where it is desired to detach the trailer and use the tractor or main vehicle by itself, the flexible pipe portions, 90ᵃ and 91ᵃ, will be disconnected, and it will be necessary to close these pipes in order that the brake mechanism of the tractor may be applied by the actuator in the usual manner. The pipe, 91, can be very readily closed, for this purpose, by moving the auxiliary controlling valve, 94, into its intermediate position in which the ports, 93ᵃ and 93ᶜ, are closed, and we have shown in Figs. 1 to 6 for example, a cut-off valve, 90ᵇ, in a connecting pipe, 90, which can be closed when the vehicles are disconnected, and opened when the trailer is connected to the main vehicle, and the pipe connections, 90ᵃ and 91ᵃ, are restored. In Fig. 7 we have illustrated a similar cut-off valve, 290ᵇ, in the pipe, 290, and in Fig. 8 we have illustrated a similar cut-off valve, 490ᵇ, in the pipe, 490. In each of these modifications the other connecting pipe may be closed by locking the auxiliary valve in its intermediate position. Obviously the pipes, 91, 291, and 491, may be provided with similar cut-off valves, and we have illustrated such at 91ᵇ, 291ᵇ, and 491ᵇ, in Figs. 1 to 6, 7 and 8, respectively, but obviously the auxiliary controlling valve may be relied upon to effect the closing of this pipe, if desired.

What we claim and desire to secure by Letters Patent is:—

1. The combination with a main and an auxiliary power actuator, each comprising a cylinder and a piston therein provided with means for connecting it with a part to be operated, controlling valve mechanism for the main actuator, tubular connections extending between and connecting said actuators for joint operation, means for establishing differential pressures in both actuator cylinders on corresponding faces of the pistons therein, to effect a substantially simultaneous and corresponding movement of the main and auxiliary actuator pistons under the control of the controlling valve mechanism for the main actuator, and a main operator operated device connected with said valve mechanism, of an auxiliary controlling valve mechanism constructed to effect the operation of the auxiliary actuator and the part to be operated thereby, without operating the main actuator, and an auxiliary operator operated device connected with said auxiliary controlling valve mechanism.

2. The combination with a main and an auxiliary power actuator, each comprising a cylinder and a piston therein provided with means for connecting it with a part to be operated, controlling valve mechanism for the main actuator, pipe connections extending between and connecting said actuators for joint operation, means for establishing differential pressures in both actuator cylinders on corresponding faces of the piston therein, to effect a substantially simultaneous and corresponding power stroke of the main and auxiliary actuator pistons under the control of the controlling valve mechanism for the main actuator, and a main operator operated device connected with said valve mechanism, of an auxiliary controlling valve mechanism located in tubular connections between the portions of said cylinders in rear of the pistons therein, and constructed to cut off communication between said actuator cylinders before or during a power stroke of either piston, and also to effect the operation of the auxiliary actuator and the part operated thereby, without operating the main actuator, and an auxiliary operator operated part connected with said auxiliary controlling valve mechanism, whereby said actuators may be substantially simultaneously operated by the main operator operated part, and said actuators may be operated independently by their respective operator operated parts.

3. The combination with a main and an auxiliary power actuator, each comprising a cylinder and a piston therein provided with means for connecting it with a part to be operated, controlling valve mechanism for the main actuator, pipe connections extending between and connecting said actuators for joint operation, means for establishing differential pressures in both actuator cylinders on corresponding faces of the piston therein, to effect a substantially simultaneous and corresponding power stroke of the main and auxiliary actuator pistons under the control of the controlling valve mechanism for the main actuator, and a main operator operated device connected with said valve mechanism, of an auxiliary controlling valve mechanism located in a pipe connection between the portions of said actuator cylinders in rear of the pistons therein, said auxiliary valve mechanism being constructed to normally maintain communication between said actuators through said pipe connection to close said pipe connection in another position of the valve mechanism, to separate said actuators, and in another position of the valve mechanism to establish differential pressures in the auxiliary actuator cylinder to operate the piston therein, without operating the main actuator, and an auxiliary operator operated part connected with said auxiliary controlling valve mechanism, whereby said actuators may be substantially simultaneously operated under the control of the controlling valve mechanism for the main actuator, and each actuator may be operated independently.

4. The combination with a main and an auxiliary power actuator, each comprising a cylinder and a piston therein provided with means for connecting it with a part to be operated, controlling valve mechanism for the main actuator, means for connecting the main actuator cylinder with a source of suction and with a source of higher pressure fluid under the control of said valve mechanism, means for normally holding said valve mechanism in position to maintain a partial vacuum on both sides of the main actuator piston when in retracted position, pipe connections extending between said actuators, to permit said valve mechanism to effect a substantially simultaneous power stroke of both pistons and to assist in maintaining a partial vacuum on both sides of the auxiliary piston when the main actuator piston is in retracted position, and a main operator operated device connected with said controlling valve mechanism, of an auxiliary controlling valve mechanism located in a pipe connection between the portions of said actuator cylinders in rear of the piston thereon, and constructed to normally maintain them connected for joint operation, and to disconnect them in another position of the valve mechanism to permit the independent operation of the main actuator under the control of its valve mechanism, and in another position to effect the operation of the auxiliary actuator without operating the main acuator, the power strokes of said actuators being effected by the admission of higher pressure fluid on one side of their pistons without withdrawing appreciable quantities of fluid from the respective cylinders on the opposite sides of the pistons therein.

5. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, tubular connections extending between said actuators for enabling them to be jointly and correspondingly operated by said valve mechanism of the main actuator, to substantially simultaneously apply the brake mechanisms connected with their respective pistons, of an auxiliary controlling valve mechanism constructed to normally maintain said actuators connected for joint operation, and to disconnect said actuators, to permit the main actuator only to be operated by its valve mechanism, and to effect the operation of the auxiliary actuator while disconnected from the main actuator and without operating the latter, and an auxiliary operator operated part connected with said auxiliary valve mechanism.

6. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, tubular connections extending between said actuators for enabling them to be jointly and correspondingly operated by said valve mechanism of the main actuator, to substantially simultaneously apply the brake mechanisms connected with their respective pistons, of an auxiliary controlling valve mechanism constructed to normally maintain said actuators connected for joint operation, and to disconnect said actuators, to permit the main actuator only to be operated by its valve mechanism, and to effect the operation of the auxiliary actuator while disconnected from the main actuator and without operating the latter, and an auxiliary operator operated part connected with said auxiliary valve mechanism, and connections, including a provision for lost motion between the main operator operated part and the main actuator piston, for permitting the operator to add his physical force to that of the main piston to apply the brake mechanism connected to said piston and to operate said brake mechanism by physical force alone, in case of failure of power.

7. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, pipe connections extending between said actuators for enabling them to be jointly and correspondingly operated by said valve mechanism of the main actuator, to substantially simultaneously apply the brake mechanisms connected with their respective pistons, of an auxiliary controlling valve mechanism constructed to normally maintain said actuators connected for joint operation, and to disconnect said actuators, to permit the main actuator only to be operated by its valve mechanism, and to effect the operation of the auxiliary actuator while disconnected from the main actuator and without operating the latter, and an auxiliary operator operated part connected with said auxiliary valve mechanism, and means for holding said auxiliary valve mechanism in position to disconnect said actuators, to permit continuous braking operations of the brake mechanism connected with the main actuator, without operating the auxiliary actuator and the brake mechanism connected therewith.

8. In a brake system for automotive vehicles provided with an internal combustion engine having a suction passage wherein a sub-atmospheric pressure is maintained when the throttle valve is closed or partially closed and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, a normally open tubular connection extending from the main actuator cylinder in rear of the piston therein to the auxiliary actuator cylinder in rear of the piston therein, an auxiliary controlling valve mechanism in said tubular connection, constructed to normally maintain said cylinders in communication, and to disconnect said cylinders, and to connect the portion of said tubular connection leading to the auxiliary cylinder with the atmosphere while said portion is disconnected from the main actuator, and means for subjecting the auxiliary cylinder forward of the piston therein to said sub-atmospheric pressure in the suction passage, and an auxiliary operator operated part connected with said auxiliary controlling valve mechanism.

9. In a brake system for automotive vehicles provided with an internal combustion engine having a suction passage wherein a sub-atmospheric pressure is maintained when the throttle valve is closed or partially closed and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, a normally open tubular connection extending from the main actuator cylinder in rear of its piston to the auxiliary actuator cylinder in rear of its piston, a valve in said tubular connection, comprising a casing having ports communicating with said air connection, and a separate air inlet port, and a rotary valve in said casing, provided with a passage for normally connecting the ports communicating with said tubular connection to establish communication between the cylinder, and adapted to close the port communicating with the main actuator cylinder to disconnect said cylinders, in one position of the valve, and to connect the port communicating with the auxiliary actuator cylinder with the air inlet port in another position of the valve while maintaining the separation of said cylinders, means for subjecting the auxiliary actuator cylinder forward of its piston to said sub-atmospheric pressure in the suction passage, and an auxiliary operator operated part connected with said auxiliary valve.

10. In a brake system for automotive vehicles provided with an internal combustion engine having a suction passage wherein a sub-atmospheric pressure maintained when the throttle valve is closed or partially closed and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, said valve mechanism being constructed to normally connect the portions of the main actuator cylinder on both sides of the piston with the suction passage when the piston is in retracted position, to maintain the main actuator piston normally submerged in vacuum, a normally open tubular connection from the main actuator cylinder in rear of its piston to the auxiliary actuator cylinder in rear of its piston, an auxiliary valve mechanism in said tubular connection constructed to normally maintain said cylinders in communication, and adapted to close the communication between said cylinders in one position of the valve mechanism, and to connect the auxiliary actuator cylinder with the atmosphere while disconnected from the main actuator cylinder, in another position of the valve mechanism, means for subjecting the auxiliary actuator cylinder forward of the piston to said sub-atmospheric pressure in the suction passage of the engine when both valve mechanisms are in their normal or off positions, thereby maintaining the auxiliary actuator piston also submerged in vacuum, and an auxiliary operator operated part connected with said auxiliary valve mechanism.

11. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, a tubular connection connecting the parts of said cylinders forward of their respective pistons, a tubular connection connecting the portions of said cylinders in rear of their respective pistons, auxiliary valve mechanism in said last mentioned tubular connection constructed to normally maintain said cylinders connected, and in one position of the valve mechanism to disconnect said cylinders, and in another position of the valve mechanism to connect the auxiliary actuator cylinder in rear of its piston with the atmosphere, and an auxiliary operator operated device connected with said auxiliary valve mechanism.

12. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, said valve mechanism being constructed to normally connect the portions of the main actuator cylinder on both sides of the piston with the suction passage when the piston is in retracted position, to maintain the main actuator piston normally submerged in vacuum, a tubular connection for connecting said actuator cylinders forward of their respective pistons, a tubular connection for connecting said cylinders in rear of said pistons, auxiliary valve mechanism in said last mentioned tubular connection constructed to normally maintain said cylinders connected, whereby the auxiliary actuator piston also is normally maintained submerged in vacuum, said auxiliary valve mechanism being constructed to disconnect said cylinders in one position, and in another position to connect the auxiliary cylinder in rear of its piston with the atmosphere while maintaining the separation between the cylinders, and an auxiliary operator operated part connected with said auxiliary valve mechanism.

13. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, a tubular connection for connecting said cylinders forward of their respective pistons, a tubular connection for connecting said cylinders in rear of their respective pistons, auxiliary valve mechanism in said last mentioned tubular connection comprising a valve casing provided with ports communicating with the main and auxiliary cylinders respectively, and an air inlet port, a movable valve in said casing, provided with means for normally connecting the respective cylinder ports, for closing the port communicating with the main actuator cylinder, in one position of the valve, and in another position of the valve for connecting the other cylinder port with the air inlet port while maintaining the first mentioned cylinder port closed, and an auxiliary operator operated part connected with the auxiliary valve mechanism.

14. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, said valve mechanism being constructed to normally connect the portions of the main actuator cylinder on both sides of the piston with the suction passage when the piston is in retracted position, to maintain the main actuator piston normally submerged in vacuum, a tubular connection for connecting said cylinders forward of their respective pistons, a tubular connection for connecting said cylinders in rear of said piston, an auxiliary valve mechanism in said last mentioned tubular connection, comprising a valve casing having an air inlet port, and ports connected with said cylinders respectively, a movable valve in said casing provided with a passage for normally placing said cylinder ports in communication with each other, whereby the auxiliary actuator piston is also maintained normally submerged in vacuum, said valve being constructed to close the port communicating with the main actuator cylinder in one position, and in another position to connect the auxiliary actuator cylinder with the air inlet port in another position of the valve, and an auxiliary operator operated part connected with said auxiliary valve mechanism.

15. The combination with a main and an auxiliary power actuator, each comprising a cylinder and a piston therein provided with means for connecting it with a part to be operated, controlling valve mechanism for the main actuator, pipe connections extending between and connecting said actuators for joint operation, means for establishing differential pressures in both actuator cylinders on opposite faces of the pistons therein, to effect the substantially simultaneous and corresponding movements of the main and auxiliary actuator pistons under the control of the controlling valve mechanism for the main actuator, and a main operator operated device connected with said valve mechanism, of an auxiliary controlling valve mechanism constructed to normally maintain communication between said cylinders to permit the joint operation thereof, and to cut off communication between said actuator cylinders when moved to a certain extent, and to effect the operation of the auxiliary actuator and part operated thereby without operating the main actuator when moved to a further extent, a retracting spring for holding said valve mechanism in normal position, and a secondary retracting device brought into operation when the valve mechanism has been moved far enough to disconnect said cylinders.

16. In brake mechanism for automotive vehicles provided with an internal combustion engine having a suction passage and independently operable brake mechanism, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, tubular connections between said actuators for enabling them to be jointly and correspondingly operated by the valve mechanism, of the main actuator to substantially simultaneously apply the brake mechanisms connected with their pistons, and including tubular connections between the portions of said cylinders in rear of their pistons, an auxiliary valve mechanism in said tubular connection, comprising a valve casing provided with ports communicating with said cylinders respectively, and an air inlet port, a valve in said casing provided with a passage for normally connecting said cylinders and adapted when moved into one position to close the port communicating with the main cylinder, and when further moved to another position to connect the port communicating with the auxiliary actuator cylinder with said air inlet port, an operating arm for said valve, a retracting spring connected with said arm for holding the valve in its normal position, an auxiliary spring connected with said arm by means permitting lost motion, and adapted to be brought into operation after said arm has been moved into position to cause said valve to disconnect said cylinders, and an auxiliary operator operated part connected with said valve mechanism.

17. In brake mechanism for a tractor automotive vehicle provided with an internal combustion engine having a suction passage, and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuators, means for connecting both actuator cylinders on opposite faces of the pistons therein with said suction passage and with the atmosphere, to effect the substantially simultaneous and corresponding movements of said pistons and the brake mechanisms connected therewith under the control of the controlling valve mechanism for the main actuator, and a main operator operated part on the tractor connected with said valve mechanism, of an auxiliary controlling valve mechanism constructed to effect the operation of the auxiliary actuator and the trailer brakes operated thereby without operating the main actuator and tractor brakes, and an auxiliary operator operated part on the tractor connected with said auxiliary controlling valve mechanism.

18. In brake mechanism for a tractor automotive vehicle provided with an internal combustion engine having a suction passage, and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuators, means for connecting both actuator cylinders on opposite faces of the pistons therein with said suction passage and with the atmosphere, to effect the substantially simultaneous and corresponding movements of said pistons and the brake mechanisms connected therewith under the control of the controlling valve mechanism for the main actuator, and a main operator operated part on the tractor connected with said valve mechanism, of an auxiliary controlling valve mechanism constructed to disconnect said actuators to permit the operation of the tractor brakes without operating the trailer brakes, and to independently effect the operation of the auxiliary actuator and trailer brakes without operating the main actuator and tractor brakes, and an auxiliary operator operated part on the tractor connected with said controlling valve mechanism.

19. In brake mechanism for a tractor automotive vehicle provided with an internal combustion engine having a suction passage, and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuators, means for connecting both actuator cylinders on opposite faces of the pistons therein with said suction passage and with the atmosphere, to effect a substantially simultaneous and corresponding movement of said pistons and the brake mechanisms connected therewith under the control of the controlling valve mechanism for the main actuator, and a main operator operated part on the tractor connected with said valve mechanism, of an auxiliary controlling valve mechanism constructed to disconnect said actuator cylinders and permit the operation of the tractor brakes without operating the trailer brakes, and also to effect the operation of the auxiliary actuator and trailer brakes without operating the main actuator, and an auxiliary operator operated part on the tractor connected with said auxiliary controlling valve mechanism, and means for normally holding the valve mechanism of the main actuator in position to maintain the pistons of both actuators submerged in vacuum when said pistons are in retracted position, whereby the operation of either or both of said actuators to apply the brake mechanism connected therewith may be effected without admitting material quantities of air to said suction passage.

20. In brake mechanism for a tractor automotive vehicle provided with an internal combustion engine having a suction passage and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuators, means for connecting both actuator cylinders on opposite faces of the pistons therein with said suction passage and with the atmosphere, to effect a substantially simultaneous and corresponding movement of said pistons and the brake mechanisms connected therewith under the control of the controlling valve mechanism for the main actuator, and a main operator operated part on the tractor connected with said valve mechanism, of an auxiliary controlling valve mechanism constructed to effect the operation of the auxiliary actuator and the trailer brakes operated thereby without operating the main actuator and the tractor brakes, and an auxiliary operator operated part on the tractor connected with said auxiliary controlling valve mechanism, and operative connections between the main operator operated part and the brake mechanism connected with the main actuator piston, including a provision for lost motion to permit the operator to add his physical force to the tractor brake mechanism in addition to that of the main actuator, and to operate said tractor brake mechanism by physical force alone in case of failure of power.

21. In brake mechanism for a tractor automotive vehicle provided with an internal combustion engine having a suction passage and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuators, means for connecting both actuator cylinders on opposite faces of the pistons therein with said suction passage and with the atmosphere, to effect a substantially simultaneous and corresponding movement of said pistons and the brake mechanisms connected therewith under the control of the controlling valve mechanism for the main actuator, and a main operator operated part on the tractor connected with said valve mechanism, of an auxiliary controlling valve mechanism constructed to effect the operation of the auxiliary actuator and the trailer brakes operated thereby without operating the main actuator and tractor brakes, and an auxiliary operator operated part on the tractor connected with said auxiliary controlling valve mechanism, and means on the tractor for permanently closing the connections extending from the main actuator to the auxiliary actuator to permit the operation of the tractor brake mechanism when the trailer is detached.

22. In a brake system for automotive vehicles provided with an internal combustion engine having a suction passage and independently operable brake mechanisms, the combination with a main actuator and an auxiliary actuator, each comprising a cylinder and a piston therein, connections from each piston to different brake mechanisms, controlling valve mechanism for the main actuator, means for connecting said main actuator cylinder with said suction passage and with the atmosphere under the control of said valve mechanism, a main operator operated part connected with said valve mechanism, means including tubular connections extending between said actuators for enabling them to be jointly and correspondingly operated under the control of said valve mechanism of the main actuator to substantially simultaneously apply the brake mechanism connected with their respective pistons, of an auxiliary controlling valve mechanism constructed to normally maintain said actuators connected for joint operation, and to disconnect said actuators to permit the main actuator only to be operated by its valve mechanism, and to effect the operation of the auxiliary actuator while disconnected from the main actuator and without operating the latter, and a check valve located in a tubular connection connected with the portion of the auxiliary actuator cylinder forward of the piston therein for maintaining rarefaction in said portion of said cylinder, whereby in case of breakage of said tubular connections the auxiliary actuator will be operated to apply the brakes connected therewith.

23. In a brake system for automotive vehicles provided with an internal combustion engine having a suction passage and independently operable brake mechanisms, the combination with a main actuator and an auxiliary actuator, each comprising a cylinder, and a piston therein, connections from each piston to different brake mechanism, controlling valve mechanism for the main actuator, means for connecting said main actuator cylinder with said suction passage and with the atmosphere under the control of said valve mechanism, a main operator operated part connected with said valve mechanism, tubular connections for connecting the portions of said cylinders in rear of the pistons thereof, tubular connections for connecting the portions of the cylinders forward of the pistons thereof, a check valve in said connections adjacent to the auxiliary actuator cylinder, of an auxiliary controlling valve mechanism located in the tubular connections between the portions of the cylinders in rear of their pistons, constructed to maintain said actuators connected for joint operation under the control of the valve mechanism for the main actuator to apply the brakes connected with the pistons of both actuators, said auxiliary valve mechanism being constructed to disconnect said cylinders to permit the main actuator only to be operated by its valve mechanism and to effect the operation of the auxiliary actuator while disconnected from the main actuator without operating the latter, said check valve serving to maintain rarefaction in the auxiliary actuator cylinder forward of the piston regardless of changes in pressure in the corresponding portion of the main actuator and to maintain such rarefaction and permit the auxiliary actuator to apply the brake mechanism connected therewith in case of breakage of said tubular connections.

24. In brake mechanism for a tractor automotive vehicle provided with an internal combustion engine having a suction passage, and a trailer connected with and propelled by the tractor, each vehicle being provided with independently operable brake mechanism, the combination with a power actuator carried by each vehicle comprising a cylinder and a piston therein, connections from the piston of each actuator to the brake mechanism of the vehicle by which it is carried, controlling valve mechanism for the main actuator, tubular connections between said actuator cylinders including frangible portions extending from the tractor to the trailer, for enabling both actuators and the tractor and trailer brake mechanisms to be substantially simultaneously operated under the control of the valve mechanism for the main actuator, a main operator operated part on the tractor connected with said valve mechanism, of an auxiliary controlling valve mechanism located in the portion of said tubular connections connecting the cylinders in rear of the pistons therein and constructed to normally connect said cylinders for joint operation to separate said cylinders in one position of the auxiliary valve mechanism, and in another position thereof to independently effect the operation of the auxiliary actuator, and a check valve in a portion of said tubular connections connected with the auxiliary cylinder forward of the piston therein for maintaining rarefaction in said portion of the auxiliary actuator cylinder regardless of changes in pressure in the corresponding portion of the main cylinder and maintaining said rarefaction in case the trailer becomes disconnected from the tractor and the frangible portions of said tubular connections are disconnected to effect automatically the operation of the auxiliary actuator and the application of the trailer brake mechanism.

In testimony whereof we affix our signatures.

CALEB S. BRAGG.
VICTOR W. KLIESRATH.